Oct. 27, 1970  MASAMI KITAMURA  3,536,533
FUEL CELL ELECTRODE
Filed April 13, 1965  2 Sheets-Sheet 1
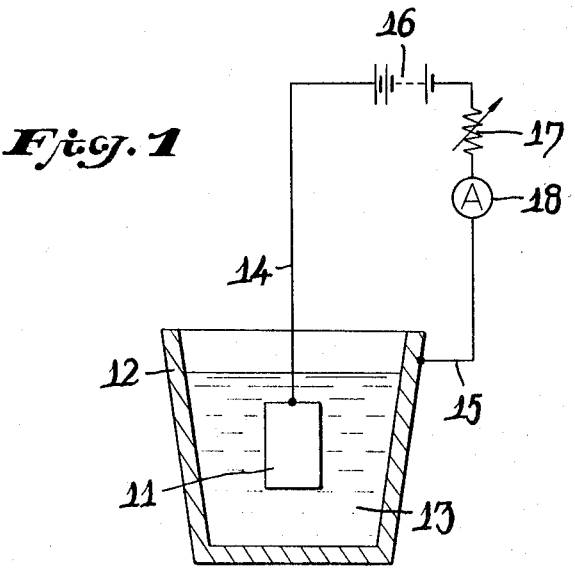
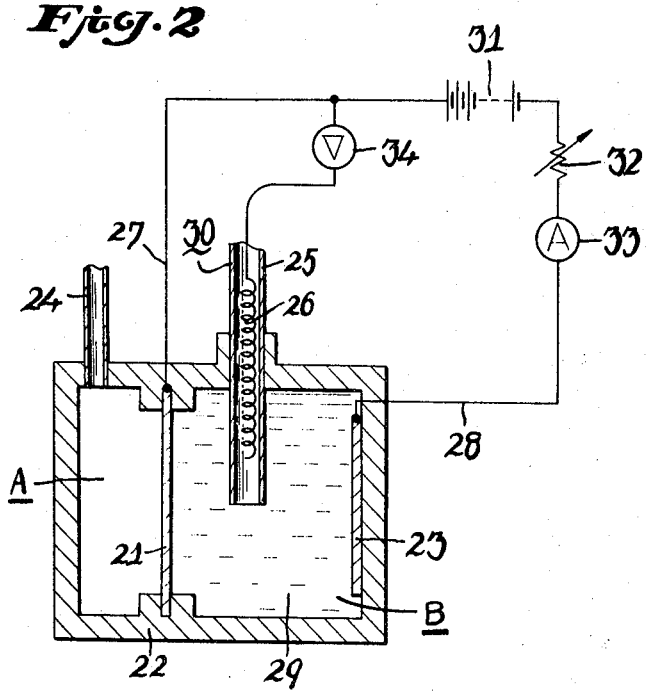
INVENTOR
Masami Kitamura
BY
ATTORNEY 3,536,533
FUEL CELL ELECTRODE
Masami Kitamura, 1–1 Tanabe-Shinden,
Kawasaki-shi, Japan
Filed Apr. 13, 1965, Ser. No. 447,833
Int. Cl. H01m 27/00
U.S. Cl. 136—86                                1 Claim

ABSTRACT OF THE DISCLOSURE

A fuel cell comprising at least one fuel electrode, at least one oxidizing electrode and an electrolyte, wherein the fuel electrode comprises an alloy membrane, the alloy consisting essentially of approximately a 20–35% mixture of gold and silver, with the major component of the mixture being silver, approximately 0.2–5% of at least one element selected from the group consisting of platinum, rhodium and ruthenium and the remainder palladium.

---

The present invention relates to fuel cell electrodes, in general, and to improvements in hydrogen permeable fuel cell electrodes, in particular.

The term "fuel cell" as used herein refers to an electrochemical cell capable of generating electrical energy through electrochemical combustion of fuel with oxidizing agents.

In general, the fuel cell usually consists of a fuel electrode, an oxidizing electrode and an external electrical circuit which electrically connects the fuel electrode with the oxidizing electrode.

A fuel gas such as hydrogen circulates on one side of the fuel electrode and an oxidizing gas such as air circulates on one side of the other electrode. In the case of an acid electrolyte fuel cell, the hydrogen diffuses in the electrolyte passing through the fuel electrode and the hydrogen molecule is divided into a hydrogen ion and an electron which flows into the oxidizing electrode through the external electrical circuit.

On the other hand, oxygen in the oxidizing gas receives electrons from the external electrical circuit forming water molecules in combination with the hydrogen ions. Thus, according to the external electron flow from the fuel electrode to the oxidizing electrode through the external electrical circuit, the oxidizing electrode and the fuel electrode, respectively, constitute the positive electrode and the negative electrode.

It is necessary in the manufacture of the fuel electrode, especially for higher temperatures, to use materials having high permeability to hydrogen. At the same time, the material is also required to have high tensile strength at high temperature and corrosion resistance against the electrolyte and/or the fed fuel gas at relatively higher temperatures. In addition, the material is further required to maintain constant mechanical properties for prolonged use. In some cases, a non-porous palladium membrane or a non-porous palladium alloy membrane has been applied as a fuel electrode of fuel cells, since they quickly and selectively promote the permeability of the electrode to hydrogen. However, it has been found that hydrogen permeable membranes made of pure palladium tend to absorb a large amount of hydrogen below 150° C., thus producing palladium-hydrogen alloy called "β-phase." Further, these membranes become hard and brittle, and thus are not practical for use.

The palladium-silver alloy membrane specified in U.S. Pat. No. 3,092,517 may retain superior characteristics of brittleness at lower temperatures; however, it is still insufficient in corrosion resistance and tensile strength at higher temperatures; particularly, the material would not be recommended for the hydrogen permeable electrode of a high temperature fuel cell which substantially uses fused salt as an electrolyte.

Also, in the case where pure hydrogen is not applied as a fuel gas, but dissociated ammonia gas or a mixture gas obtained from the steam reforming of hydrocarbon is used, the palladium-silver alloy membrane electrode exhibits high efficiency but is not sufficient for long duration use due to its insufficient anti-corrosion properties against fused salt and high temperature steam or undissociated ammonia gas contained in the fuel gas. Consequently, the palladium-silver alloy membrane fails to withstand prolonged application. When the palladium-silver alloy is exposed to high temperatures for long periods, recrystallization of the alloy causes the mechanical properties to deteriorate.

It is one object of the present invention to provide a hydrogen permeable electrode having high permeability to hydrogen, the latter supplied as the fuel gas, and having a high tensile strength even at high temperature.

It is another object of the present invention to provide a hydrogen permeable electrode which has high corrosion resistance against electrolytes, for example, fused salt.

It is still another object of the present invention to provide a hydrogen permeable electrode having a high corrosion resistance against ammonia and steam contained in fuel gas at high temperatures.

Still another, and probably the most unusual and distinct, object and feature of the present invention is to provide a hydrogen permeable electrode which exhibits constant stability in mechanical properties and which does not form β-phases, excessively, even at lower temperatures.

It is yet still another object of the present invention to provide a fuel cell electrode of an alloy consisting of approximately 20–35% of a mixture of gold and silver, with the major portion being silver, and about 0.2–5% of at least one element selected from the group consisting of platinum, rhodium and ruthenium, and the remainder palladium.

The "alloy membrane" as used herein means various kinds of materials, having shapes such as flat, corrugated, tubular, etc.

The aforementioned alloy in accordance with the present invention has a greater hydrogen permeability, about 34–140% as compared with the pure palladium or palladium-silver alloy. In addition, the tensile strength thereof at high temperatures also has greater values, twice as great, compared with the conventional types. Furthermore, the present alloy has not only a high corrosion resistance against high temperature gaseous materials, such as steam or ammonia, but also has a distinctly slow crystal growth even at higher temperature.

Consequently, a change in the mechanical properties caused by a recrystallization of the alloy would not be expected.

On the other hand, in order to particularly apply the fuel electrode for a fuel cell, the material is to be unreactive with the fuel gas and the electrolyte.

With these and other objects in view, which will become apparent in the following detailed description, the present invention will be clearly understood in connection with the accompanying drawings, in which:

FIG. 1 is a testing device for measuring the corrosion resistance of a hydrogen permeable electrode of the present invention against fused salt;

FIG. 2 is a device for testing the electrode characteristics of an alloy membrane electrode according to the present invention;

Figure 3:
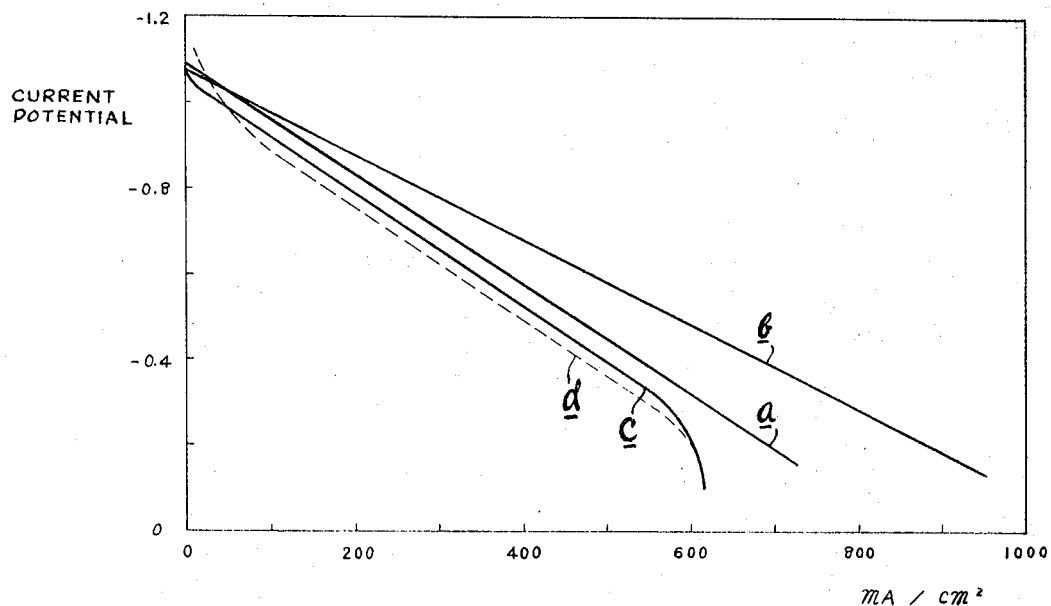
FIG. 3 is a graph of current potential which represents an electrode property of the alloy membrane hydrogen electrode according to the present invention.

Referring now to the drawings, and more particularly to FIG. 1, the allow membrane 11 is approximately 0.1 mm. in thickness and approximately 2 cm.$^2$ in surface area and was applied in a test for measuring corrosion resistance against fused salt.

A gold wire 14 (0.2 mm. in diameter) was spot welded to the testing alloy membranes 11. A mixture 13 was placed in a gold crucible 12, the mixture consisting of lithium carbonate ($LI_2CO_3$), sodium carbonate ($NA_2CO_3$) and potassium carbonate ($K_2CO_3$) at a 4:3:3 molar ratio. Test piece 11 was dipped therein.

A gold wire 15 was connected to the gold crucible 12; and a D.C. power supply 16, variable resistor 17, and ammeter 18 were connected in series with each other between the wires 14 and 15.

The crucible 12 was then inserted into a furnace which was continuously fed with carbon dioxide gas and was heated at a temperature exceeding 400° C. The carbonate mixture 13 then melted. Next an electric current was applied between the test piece 11 and the crucible 12. The test piece 11 was taken out after a definite time in order to measure the weight loss or gain and to observe surficial changes. The conditions applied for executing the present experimental test were an electrolyte temperature of 800° C., an electrolytic current of 100 ma./cm.$^2$, referred to the test electrode and a one hour electrolyzing period.

The experimental results obtained from various kinds of alloys according to the present invention are set forth in Table 1 for comparative purposes with the experimental results obtained from palladium, silver and palladium-silver alloy.

mental cell as specified in FIG. 2. In FIG. 2 a hydrogen permeable membrane electrode 21 is held, gas and liquid tight in a housing 22 consisting of refractory and insulative materials. The housing 22 is divided into two chambers, such as a gas-chamber A and an electrolytic solution chamber B. A fuel gas feed pipe 24 and an exhaust pipe (not shown) leading respectively into and away from the chamber A are provided, while on the opposite side of the membrane electrode 21 in the chamber B, a counter electrode 23 consisting of palladium-gold alloy is provided.

From the upper part of the chamber B, a reference electrode 30 constituted of a ceramic pipe 25 in which a silver wire 26 is held, is inserted into the chamber B which is filled up with carbonate mixture 29 consisting of lithium carbonate, sodium carbonate and potassium carbonate at a 7:5:4 molar ratio.

The carbonate mixture 29 usually melts at about 400° C. and performs as an electrolyte. The distance between the hydrogen permeable electrode 21 and the counter electrode 23 is 3 cm.; and the distance between the reference electrode 30 and the hydrogen permeable electrode 21 is 1 cm.

Connecting wires 27 and 28 are respectively connected to the electrode 21 and the counter electrode 23. Between the wires 27 and 28, an external D.C. power supply 31, a variable resistor 32 and an ammeter 33 are connected and the silver wire 26, extending from the reference electrode 30 is connected to the test electrode 21 through a voltmeter 34.

This complete experimental cell is constructed in a furnace (not shown), a gas mixture of carbon dioxide and hydrogen having a 0.5 kg./cm.$^2$ pressure being supplied to chamber A from a fuel gas conducting pipe 24.

TABLE I

| | Alloy composition, weight percent | Weight change, mg./cm.$^2$/AH | Surficial state |
|---|---|---|---|
| Present invention | Pd 65, Ag 28, Au 5, Ru 2 | −0.9 | Slightly etched. |
| | Pd 70, Au 25, Rh 5 | ±0.0 | Scarcely changed. |
| | Pd 68, Ag 30, Ru 2 | −1.3 | A little etched. |
| | Pd 65, Ag 10, Au 20, Pt 1, Rh 2, Ru 1.8, Fe 0.2 | +0.2 | Presents gray colored. |
| Other materials | Pd | −2.0 | Etched with gray color. |
| | Ag | −2,400.0 | Dissolves at about 60% current efficiency. |
| | Pd 75, Ag 25 | −31.5 | Presents bluish-gray color. |

Since the palladium alloy membrane disclosed in the present invention is, as apparent from the above table, not corroded by the anodic current discharged in the molten carbonate mixture, the present alloy membrane therefore effectively performs as a hydrogen permeable electrode for prolonged use, whereas the palladium-silver alloy membrane specified in U.S. Pat. No. 3,095,517 is subject to corrosion and is not practical in use.

Some examples according to the present invention are set forth and applied for the wide range of the present application, the present invention not being limited by the illustrated examples.

EXAMPLE 1

A hydrogen permeable electrode is constructed with a non-porous membrane having a 0.15 mm. thickness and consisting of a four component alloy with a composition, such as, 65% palladium, 28% silver, 5% gold and 2% ruthenium.

Although this four component alloy membrane absorbs 0.33 atom of hydrogen per atom of metal at room temperature, no β-phase is formed.

Further, in the case there is a differential pressure such as 3 kg./cm.$^2$ on both sides of the alloy membrane, the hydrogen permeates at a rate of 4.8 cm.$^3$/cm.$^2$/min. through the membrane, under which conditions the membrane exhibits a tensile strength of 1,500 kg./cm.$^2$ at 500° C.

The polarization properties of the four component alloy membrane electrode above mentioned in the example are further examined by assembling it into the experi- At the same time, a gas mixture consisting of oxygen and carbon dioxide gas in the proportion of 1:1 by volume is supplied into the chamber B through the pipe 25. At this stage, a potential difference appearing between the hydrogen permeable electrode 21 and reference electrode 30 is measured by flowing an anodic current to the hydrogen permeable electrode 21 through the external D.C. power supply 31.

The results of this examination of the polarization properties of the four component alloy membrane electrode of this invention are set forth in FIG. 3.

In FIG. 3, the curve $a$, shows a polarization curve at 500° C., and the curve $b$ shows another polarization curve at 700° C., for this four component alloy membrane electrode of the invention. As seen from FIG. 3, the characteristic curves thereof are mostly linear, and the polarization caused by the slow diffusion or the activation polarization is slight.

EXAMPLE 2

In the case of a hydrogen permeable membrane electrode of 0.15 mm. thickness substantially consisting of 75% palladium and 25% silver tested at 500° C. under 3 kg./cm.$^2$ differential pressure on both sides, the hydrogen permeability of the membrane electrode reached 4.0 cm.$^3$/cm.$^2$/min. and the tensile strength thereof was 800 kg./cm.$^2$.

This two component hydrogen permeable membrane electrode was constructed in the experimental cell device shown in FIG. 2 and tested under the same conditions as in Example 1.

The results of the above stated testing of the afore-described two component alloy membrane electrode is indicated by curve c in FIG. 3.

Curve c has a non-linear portion and contains a polarization component caused by activation and diffusion.

Further, a polarization curve d is indicated for the case in which a tubular hydrogen permeable electrode of 0.1 mm. thickness and 3.0 mm. diameter with a composition of 25% silver and 75% palladium was dipped in an electrolyte consisting of potassium hydroxide-sodium hydroxide eutectic at 250° C. under 7 kg./cm.$^2$ pressure of hydrogen.

It will now be apparent that the four component 65% palladium, 28% silver, 5% gold, 2% ruthenium alloy membrane electrode of the present invention is far superior to the above mentioned two component alloy membrene electrode by a comparison of curves a, b, and c, d.

Although the aforementioned examples have been carried out for cases in which a low pressure of hydrogen such as 0.5 kg./cm.$^2$ was applied, an improvement of the discharge characteristics easily may be expected by increasing the supply pressure of hydrogen since the present four component alloy membrane has greater values of tensile strength. On the other hand, the conventional palladium-silver alloy membrane has a limited capacity for improvement of its discharge characteristics by increasing pressure, due to its poor tensile strength.

Table 2 shows the test results of the maximum electric currents obtained from the hydrogen permeable membrane electrodes consisting of various kinds of alloys including some in accordance with the present invention. This test was performed by using the experimental cell device of FIG. 2 incorporated with a carbonate mixture consisting of lithium carbonate, sodium carbonate and potassium carbonate in a 4:3:3 molar ratio under 1 kg./cm.$^2$ hydrogen pressure at 420° C.

The data in the case of pure palladium is also shown for comparative purposes.

TABLE 2

| Alloy Composition, weight percent | | | | | | Current, ma./cm.$^2$ |
|---|---|---|---|---|---|---|
| Pd | Group 1 B | | Group VIII | | | |
|  | Ag | Au | Pt | Rh | Ru | |
| 100 |  |  |  |  |  | 330 |
| 60 | 38 |  | 2 |  |  | 390 |
| 65 | 30 |  | 5 |  |  | 660 |
| 65 | 25 |  | 10 |  |  | 485 |
| 65 | 15 |  | 20 |  |  | 340 |
| 75 | 5 |  | 20 |  |  | 320 |
| 88 |  | 10 |  |  | 2 | 730 |
| 93 |  | 5 |  |  | 2 | 670 |
| 96 |  | 2 |  |  | 2 | 430 |
| 97 |  | 1 |  |  | 2 | 340 |
| 70 | 20 | 5 |  | 5 |  | 670 |
| 73 | 20 | 5 |  | 2 |  | 660 |
| 74.5 | 20 | 5 |  | 0.5 |  | 645 |
| 74.8 | 20 | 5 |  | 0.2 |  | 645 |
| 75 | 20 | 5 |  |  |  | 645 |

From the aforementioned Table 2 it can be observed easily that high current density can be expected particularly for alloys containing 20–35% of two elements thereof selected from group Ib, and 0.2–5.0% of an element selected from group VIII of the Periodic Table, other than palladium.

EXAMPLE 3

Figure 4:
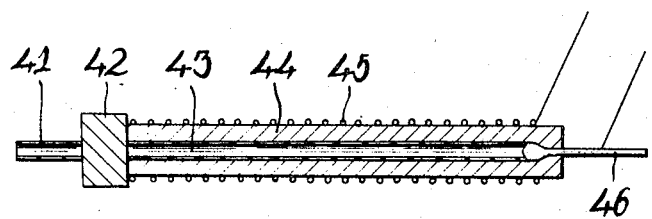
FIG. 4 is a cross-sectional view of the fuel electrode according to the present invention.

A tubular shaped alloy membrane being 2 mm. in diameter, 0.06 mm. in thickness, and 20 cm. in length, and being made of seven components such as 65% palladium, 10% silver, 20% gold, 1% platinum, 2% rhodium, 1.8% ruthenium and 0.2% iron was applied as a fuel electrode of the fuel cell shown in FIG. 4.

The afore-mentioned seven component alloy membrane absorbs 0.32 atom of hydrogen per atom of metal at room temperature and does not form β-phase as in the case of the alloy membrane in Example 2.

Further, said seven component alloy membrane has 1.15 times the hydrogen permeability in comparison with an alloy membrane applied in Example 2. The tensile strength of said seven component alloy membrane is as high as 1950 kg./cm.$^2$ at 500° C. The said seven component alloy membrane also retains a fine crystalline structure, and recrystallization does not appear despite exposure of said seven component alloy membrane electrode at high temperatures for a long period.

In FIG. 4 a hydrogen permeable fuel electrode 43 comprises a tubular shaped alloy membrane having a composition consisting of seven components. The hydrogen permeable fuel electrode 43 is provided with a purge-pipe 46 and the necessary fuel is supplied from the conducting pipe 41 through a joint 42. A pasty electrolyte 44 consists of a molten mixture of alkali-carbonates and of magnesium oxide powder which keeps the molten mixture of alkali-carbonates in position. An air electrode is then formed by winding a silver gauze 45 around the electrolyte 44. Said silver gauze is made to adhere on the outer surface of the electrode 43 with a 2 mm. thickness.

If the air containing carbon dioxide gas is made to flow into the outer surface of the cell, while supplying hydrogen having a 1.0 kg./cm.$^2$ pressure into the fuel electrode provided in the cell, the open circuit voltage of the cell is 1.02 volts at 700° C. The terminal voltage measured at a discharge current of 0.6 ampere was 0.95 volt while, 0.83 volt was provided in the case of 2.6 amperes. The drop of the terminal voltage is considered to be caused by a polarization of the air electrode and the resistance of the electrolyte.

Since the fuel cell characteristics of the present experiment are determined principally by factors other than the fuel electrode, increasing the hydrogen supply pressure is not particularly necessary; however, the tube may withstand well an internal pressure of 30 kg./cm.$^2$ at 700° C.

Further, 1.03 volts of open circuit voltage were provided when 2.6 kg./cm.$^2$ of dissociated ammonia gas was supplied into the fuel electrode at 500° C. In the meantime, the terminal voltage of 0.6 ampere discharge current was 0.90 volt while 5% of the supplied fuel gases was continuously being purged. In addition, even after the cell further was operated under the above conditions continuously for 24 hours, no change of the characteristics was observed.

What I claim is:
1. In a fuel cell comprising at least one fuel electrode, at least one oxidizing electrode and an electrolyte, the improvement in which
   said fuel electrode comprises an alloy membrane,
   said alloy membrane consists essentially of,
      approximately 20–35% of a mixture of gold and silver, wherein said silver constitutes the major component of said mixture,
      approximately 0.2–5% of at least one element selected from the group consisting of platinum, rhodium and ruthenium,
      the remainder palladium.

References Cited

UNITED STATES PATENTS

| 2,048,647 | 7/1936 | Feussner et al. | 75—172 |
| 3,134,671 | 5/1964 | Prosen | 75—172 |
| 3,291,643 | 12/1966 | Oswin et al. | 136—86 |
| 3,393,098 | 7/1968 | Hartner et al. | 136—86 |

WINSTON A. DOUGLAS, Primary Examiner

O. F. CRUTCHFIELD, Assistant Examiner

U.S. Cl. X.R.

136—120.